United States Patent
Matic et al.

(10) Patent No.: US 9,514,164 B1
(45) Date of Patent: Dec. 6, 2016

(54) SELECTIVELY MIGRATING DATA BETWEEN DATABASES BASED ON DEPENDENCIES OF DATABASE ENTITIES

(71) Applicant: Accenture Global Services Limited, Dublin (IE)

(72) Inventors: Damir Matic, Aurora, CO (US); Eric C. Peterson, Parker, CO (US)

(73) Assignee: Accenture Global Services Limited, Dublin (IE)

( * ) Notice: Subject to any disclaimer, the term of this patent is extended or adjusted under 35 U.S.C. 154(b) by 318 days.

(21) Appl. No.: 14/141,663

(22) Filed: Dec. 27, 2013

(51) Int. Cl.
*G06F 17/30* (2006.01)

(52) U.S. Cl.
CPC ....... *G06F 17/303* (2013.01); *G06F 17/30371* (2013.01)

(58) Field of Classification Search
CPC .................. G06F 17/303; G06F 17/30371
See application file for complete search history.

(56) References Cited

U.S. PATENT DOCUMENTS

| | | | |
|---|---|---|---|
| 5,564,037 A | 10/1996 | Lam | |
| 5,758,337 A * | 5/1998 | Hammond | G06F 17/30371 |
| 5,970,490 A * | 10/1999 | Morgenstern | G06F 17/30569 |
| 6,145,066 A | 11/2000 | Atkin | |
| 7,647,293 B2 * | 1/2010 | Brown | G06F 17/30471 |
| | | | 707/999.002 |
| 8,601,220 B1 | 12/2013 | Corbin et al. | |
| 2002/0013779 A1 * | 1/2002 | Sridhar | G06F 17/30392 |
| 2002/0103793 A1 * | 8/2002 | Koller | G06F 17/30469 |
| 2003/0046272 A1 * | 3/2003 | Scanzano | G06F 17/30595 |
| 2004/0015470 A1 * | 1/2004 | Smith | G06F 17/30289 |
| 2004/0015487 A1 * | 1/2004 | Lin | G06F 17/30448 |
| 2004/0015496 A1 * | 1/2004 | Anonsen | G06F 17/30607 |
| 2004/0019599 A1 * | 1/2004 | Trappen | G06F 17/30595 |
| 2005/0192921 A1 * | 9/2005 | Chaudhuri | G06F 17/30368 |
| 2006/0235899 A1 * | 10/2006 | Tucker | G06F 17/303 |
| 2009/0157572 A1 * | 6/2009 | Chidlovskii | G06N 99/005 |
| | | | 706/12 |
| 2009/0193050 A1 * | 7/2009 | Olson | G06F 17/30292 |
| 2009/0254532 A1 * | 10/2009 | Yang | G06F 17/30315 |
| 2009/0254774 A1 * | 10/2009 | Chamdani | G06F 9/4881 |
| | | | 714/2 |
| 2009/0281845 A1 * | 11/2009 | Fukuda | G06Q 10/10 |
| | | | 705/7.39 |

(Continued)

FOREIGN PATENT DOCUMENTS

WO    WO2012130489    * 10/2012 ....... G06F 17/30345

OTHER PUBLICATIONS

PCT Written Opinion in PCT/EP2012/050721.*

*Primary Examiner* — Alexey Shmatov
*Assistant Examiner* — Kurt Mueller
(74) *Attorney, Agent, or Firm* — Harrity & Harrity, LLP

(57) ABSTRACT

A device may receive information that identifies a source database and a destination database, and may receive information that identifies an entity instance included in the source database. The device may determine a base data structure, included in the source database, that is associated with the entity instance, and may generate a dependency graph that identifies a dependency between the base data structure and another data structure. The device may receive an instruction to perform an operation associated with the destination database, and may determine an evaluation order for traversing the dependency graph to generate code for performing the operation. The device may traverse the dependency graph in the evaluation order, and may generate code corresponding to respective data structures identified by the dependency graph. The device may cause execution of the code, based on the evaluation order, which may cause the operation to be performed.

20 Claims, 10 Drawing Sheets

(56) References Cited

U.S. PATENT DOCUMENTS

| | | | |
|---|---|---|---|
| 2011/0246417 A1* | 10/2011 | Maya | G06F 17/30575 707/610 |
| 2012/0330900 A1* | 12/2012 | Patwardhan | G06F 17/30563 707/690 |
| 2013/0227218 A1 | 8/2013 | Chang et al. | |
| 2014/0025658 A1* | 1/2014 | Thiyagarajan | G06F 17/30292 707/713 |
| 2014/0115012 A1* | 4/2014 | Das | G06F 17/30292 707/803 |
| 2015/0169707 A1* | 6/2015 | Buda | G06F 17/30424 707/603 |
| 2015/0172412 A1* | 6/2015 | Escriva | G06F 17/30091 709/202 |

* cited by examiner

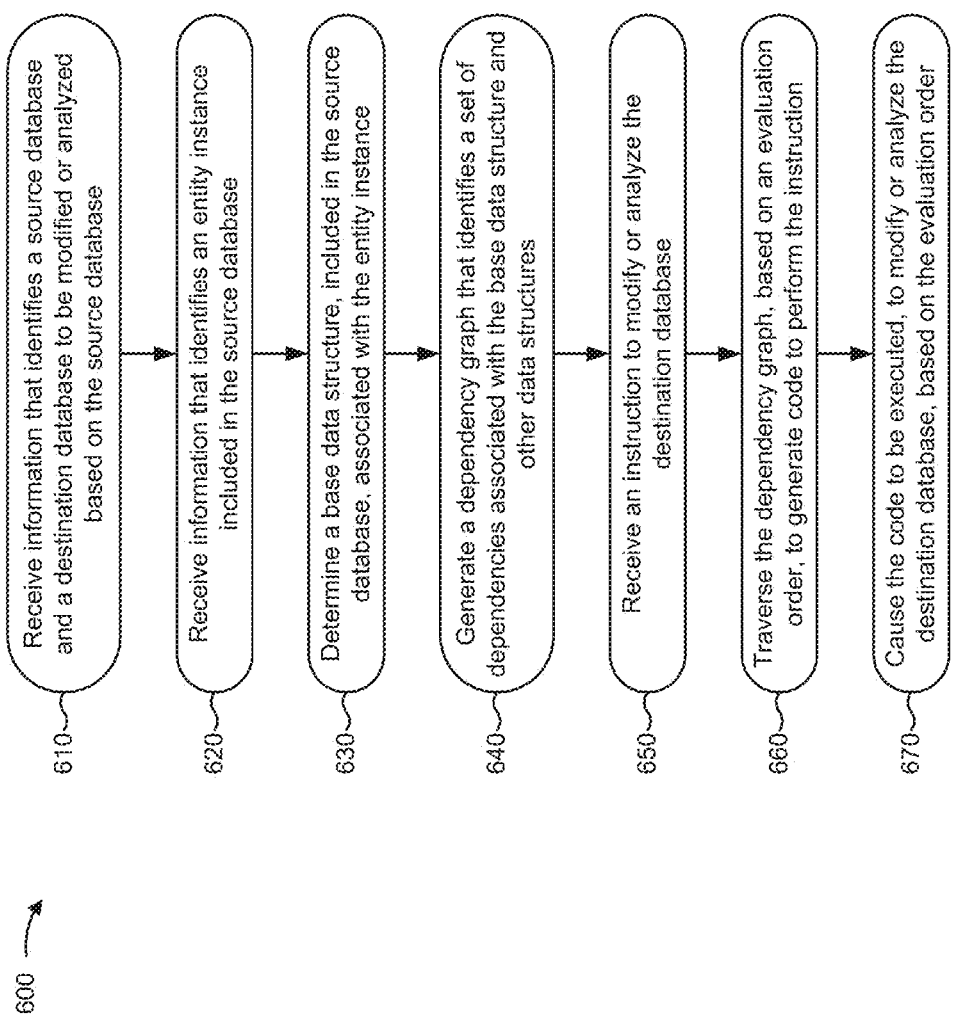

SELECTIVELY MIGRATING DATA BETWEEN DATABASES BASED ON DEPENDENCIES OF DATABASE ENTITIES

BACKGROUND

A test database system may be run in parallel with a production database system to test new configurations of the database system before the new configurations reach the production stage. When an administrator is satisfied that a new configuration has been properly tested and debugged, the administrator may migrate the new configuration from the test database to the production database.

SUMMARY

According to some possible implementations, a device may include one or more processors to: receive information that identifies a source database and a destination database; receive information that identifies an entity instance included in the source database; determine a base data structure, included in the source database, that is associated with the entity instance; generate a dependency graph that identifies a dependency between the base data structure and another data structure; receive an instruction to perform an operation relating to modifying or analyzing the destination database; determine an evaluation order for traversing the dependency graph to generate code for performing the operation, where the evaluation order is based on the dependency between the base data structure and the other data structure; traverse the dependency graph in the evaluation order; generate a plurality of portions of code corresponding to respective data structures identified by the dependency graph based on traversing the dependency graph; and cause execution of the plurality of portions of code based on the evaluation order, where the execution causes the operation to be performed using the base data structure and the other data structure.

According to some possible implementations, a computer-readable medium may store one or more instructions that, when executed by one or more processors, cause the one or more processors to: receive information that identifies a source database and a destination database; receive information that identifies an entity instance included in the source database; identify a first data structure, included in the source database, that stores information associated with the entity instance; identify a second data structure, included in the source database, that has a dependency relationship with the first data structure; generate a dependency graph that identifies the dependency relationship between the first data structure and the second data structure; traverse the dependency graph to generate code for performing an operation relating to modifying or analyzing the destination database; determine an evaluation order for executing the code, where the evaluation order is based on the dependency relationship between the first data structure and the second data structure and is further based on the operation; generate a plurality of portions of code corresponding to respective data structures identified by the dependency graph based on traversing the dependency graph, where the respective data structures include the first data structure and the second data structure; and cause execution of the plurality of portions of code based on the evaluation order, where the execution causes the operation to be performed using the first data structure and the second data structure.

According to some possible implementations, a method may include: identifying, by a device, a first database and a second database, where the first database stores information to be migrated to the second database; configuring, by the device, the first database such that a respective data structure, that stores a portion of the information to be migrated, includes a respective globally unique identifier; receiving, by the device, information that identifies a base data structure to be migrated from the first database to the second database; generating, by the device, a directed graph, in a memory of the device, where the directed graph includes nodes, representing the base data structure and a plurality of related data structures, and directed links representing dependencies between the nodes; determining, by the device, an evaluation order in which to traverse the directed graph based on the directed links; traversing, by the device, the directed graph based on the evaluation order; generating, by the device and based on traversing the directed graph, code to migrate respective data structures, represented by respective nodes accessed during the traversal, from the first database to the second database; and causing, by the device, the code to be executed, based on the evaluation order, to migrate the base data structure and the plurality of related data structures from the first database to the second database.

BRIEF DESCRIPTION OF THE DRAWINGS

FIG. 6 is a flow chart of an example process for selectively migrating data between databases based on dependencies of database entities.

DETAILED DESCRIPTION

The following detailed description of example implementations refers to the accompanying drawings. The same reference numbers in different drawings may identify the same or similar elements.

An administrator may test a database configuration using a test database before the test configuration enters a production stage. When the test configuration is ready to enter the production stage, the administrator may migrate the test configuration into a production database. However, the migration may be complicated when not all configuration items have been tested, when a configuration item is dependent upon other database entities that may also need to be migrated, when a configuration item depends from other database entities that may also need to be migrated, etc. In this case, simply synchronizing the test database and a production database may have unintended negative results. Implementations described herein may assist an administrator in selectively migrating database entities between databases based on database dependencies associated with the database entities to be migrated.

Figure 1:
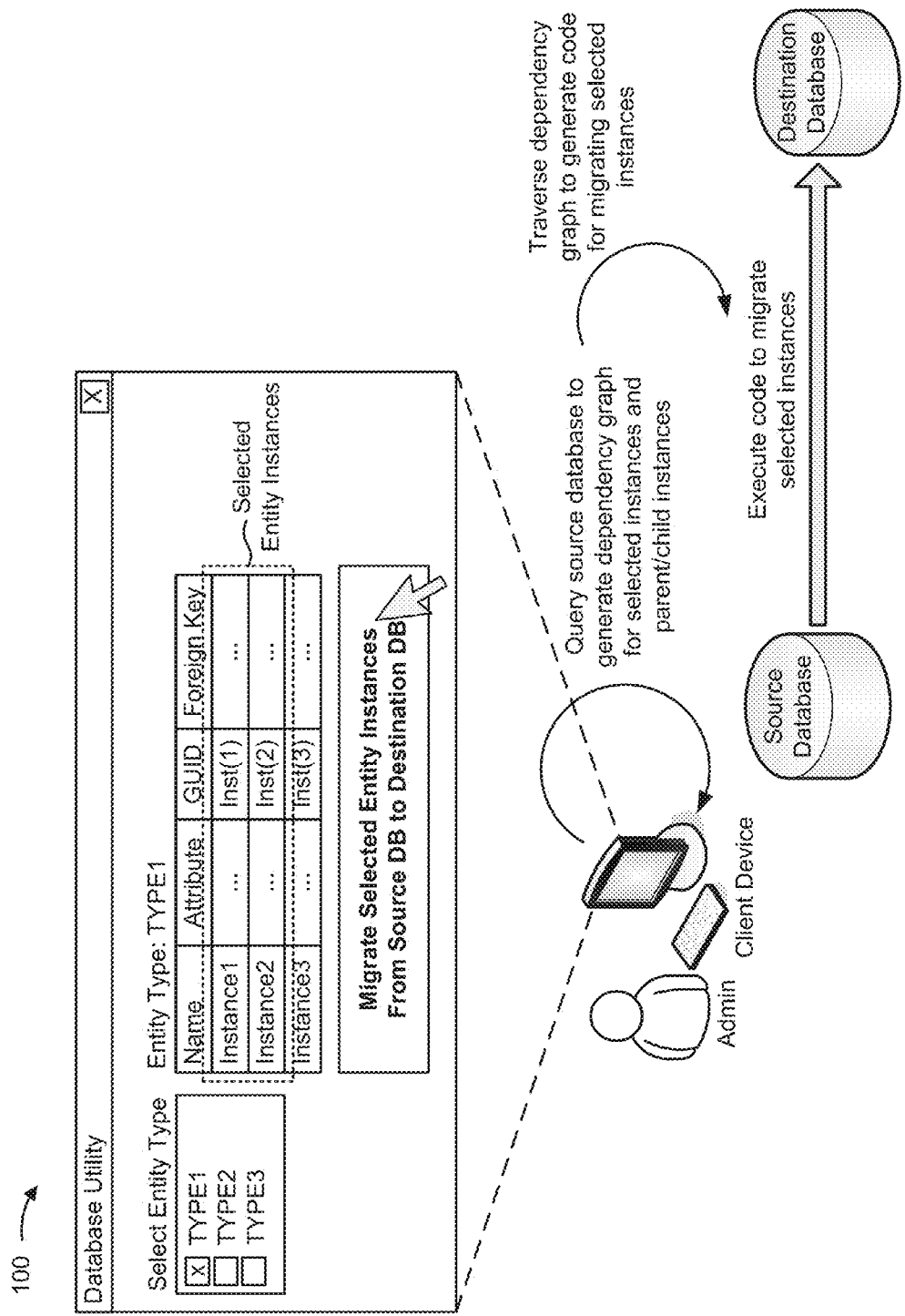
FIG. 1 is a diagram of an overview of an example implementation described herein.

FIG. 1 is a diagram of an overview of an example implementation 100 described herein. As shown in FIG. 1, an administrator, interacting with a database utility executing on a client device, may select entity instances stored in a source database (e.g., a test database). For example, assume that the administrator selects entities of type "TYPE1," and selects a first instance "Instance1" and a second instance "Instance2" of the entity type to be migrated from the source database to a destination database (e.g., a production database). As shown, the entity instances may have one or more attributes. Furthermore, each entity instance may be identified using a global unique identifier (GUID) that uniquely identifies the entity instance among all entity instances stored in the source database. Additionally, an entity instance may have a dependency relationship with another entity instance, which may be identified using a foreign key. For example, a selected entity instance may be dependent on one or more other entity instances, and/or the one or more other entity instances may be dependent on the selected entity instance. The foreign key may include a GUID that uniquely identifies the other entity instance(s).

As further shown in FIG. 1, the administrator may interact with the client device to cause the selected entity instances to be migrated from the source database to the destination database. Based on the interaction, the client device may query the source database to generate a dependency graph that identifies a set of dependency relationships associated with the selected entity instances. The dependency graph for a selected entity instance may identify, for example, parent instances upon which the selected entity instance depends (and parents of the parents, etc.) and child instances that depend upon the selected entity instance (and children of the child, etc.).

Once the dependency graph has been generated, the client device may traverse the dependency graph (e.g., in a particular evaluation order), and may generate code for migrating the selected entity instances from the source database to the destination database. As further shown in FIG. 1, the client device may execute the code (e.g., in the particular evaluation order) to migrate the selected entity instances from the source database to the destination database. Additionally, or alternatively, the code may be executed to delete entity instances from the destination database, to compare entity instances between the source database and the destination database, or the like. In this way, an administrator may select particular entity instances to be operated on, rather than being required to synchronize an entire database. Furthermore, the selected entity instances may be operated on based on dependencies associated with the selected entity instances to ensure that the destination database will continue to operate properly.

Figure 2:
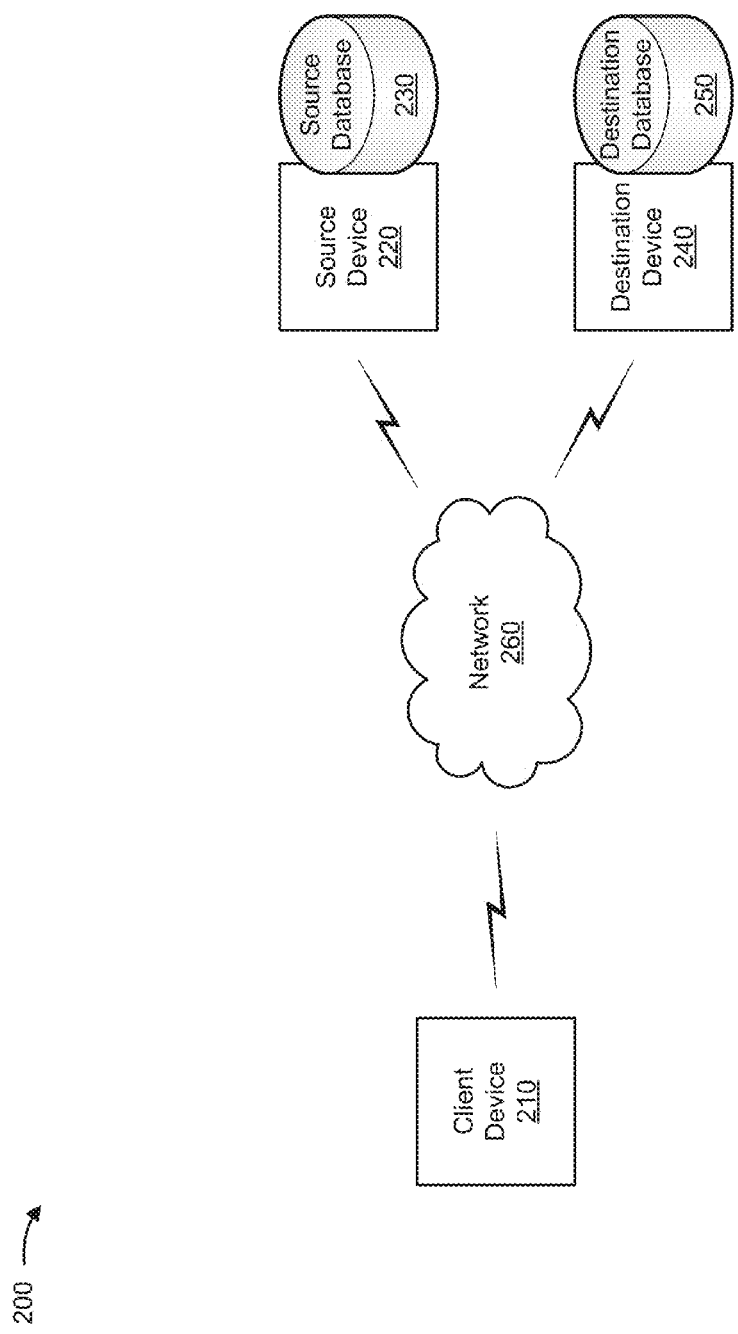
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a source device 220, a source database 230, a destination device 240, a destination database 250, and a network 260. Devices of environment 200 may interconnect via wired connections, wireless connections, or a combination of wired and wireless connections.

Client device 210 may include one or more devices capable of receiving, generating, storing, evaluating, and/or providing database information (e.g., information stored in a database). For example, client device 210 may include a computing device, such as a desktop computer, a laptop computer, a tablet computer, a handheld computer, a server, a mobile phone (e.g., a smart phone, a radiotelephone, etc.), or a similar device. Client device 210 may execute a database utility that permits a user (e.g., an administrator) to modify and/or analyze information stored in source database 230 and/or destination database 250 by, for example, migrating information from source database 230 to destination database 250 (e.g., adding and/or editing information stored in destination database 250), deleting information from source database 230 and/or destination database 250, comparing information stored in source database 230 and information stored in destination database 250, etc. In some implementations, client device 210 may receive information from and/or transmit information to source database 230 and/or destination database 250 via source device 220 and/or destination device 240.

Source device 220 may include one or more devices capable of receiving, generating, storing, evaluating, and/or providing database information. For example, source device 220 may include a computing device, such as a desktop computer, a server (e.g., a web server, a database server, etc.), or a similar device. In some implementations, source device 220 may store source database 230. Additionally, or alternatively, source device 220 may receive an instruction (e.g., from client device 210) to modify and/or analyze source database 230, and may modify and/or analyze source database 230 based on the instruction. For example, source device 220 may migrate information from source database 230 to destination database 250 based on the instruction. Source device 220 may provide a result of the modification and/or analysis to client device 210, in some implementations.

Source database 230 may include any type of database, such as a database that includes one or more tables with row(s) and column(s), a linked list, a tree, a hash table, or any other type of data structure that stores information in a structured manner. Source database 230 may be stored in a memory device (e.g., a random access memory, a hard disk, etc.) associated with one or more devices (e.g., client device 210, source device 220, destination device 240, etc.). In some implementations, source database 230 may include a test database that is used to test database configurations.

Destination device 240 may include one or more devices capable of receiving, generating, storing, evaluating, and/or providing database information. For example, destination device 240 may include a computing device, such as a desktop computer, a server (e.g., a web server, a database server, etc.), or a similar device. In some implementations, destination device 240 may store destination database 250. Additionally, or alternatively, destination device 240 may receive an instruction (e.g., from client device 210 and/or source device 220) to modify and/or analyze destination database 250, and may modify and/or analyze destination database 250 based on the instruction. For example, destination device 240 may receive information to be migrated from source database 230 to destination database 250 based on the instruction. Destination device 240 may provide a result of the modification and/or analysis to client device 210, in some implementations.

Destination database 250 may include any type of database, such as a database that includes one or more tables with row(s) and column(s), a linked list, a tree, a hash table, or any other type of data structure that stores information in a structured manner. Destination database 250 may be stored in a memory device (e.g., a random access memory, a hard disk, etc.) associated with one or more devices (e.g., client device 210, source device 220, destination device 240, etc.). In some implementations, destination database 250 may include a production database that is used to assist in performing a business operation based on a database configuration.

While shown as being stored by source device 220 and destination device 240, respectively, source database 230 and destination database 250 may be stored by another device or a group of devices separate from or including source device 220 and/or destination device 240. For example, one or more of source database 230 and destination database 250 may be stored by client device 210. Additionally, or alternatively, one or more of source database 230 and destination database 250 may be stored by a single network device (e.g., a server) that is in communication with client device 210. Additionally, or alternatively, each of source database 230 and destination database 250 may be stored across multiple devices.

Network 260 may include one or more wired and/or wireless networks. For example, network 260 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
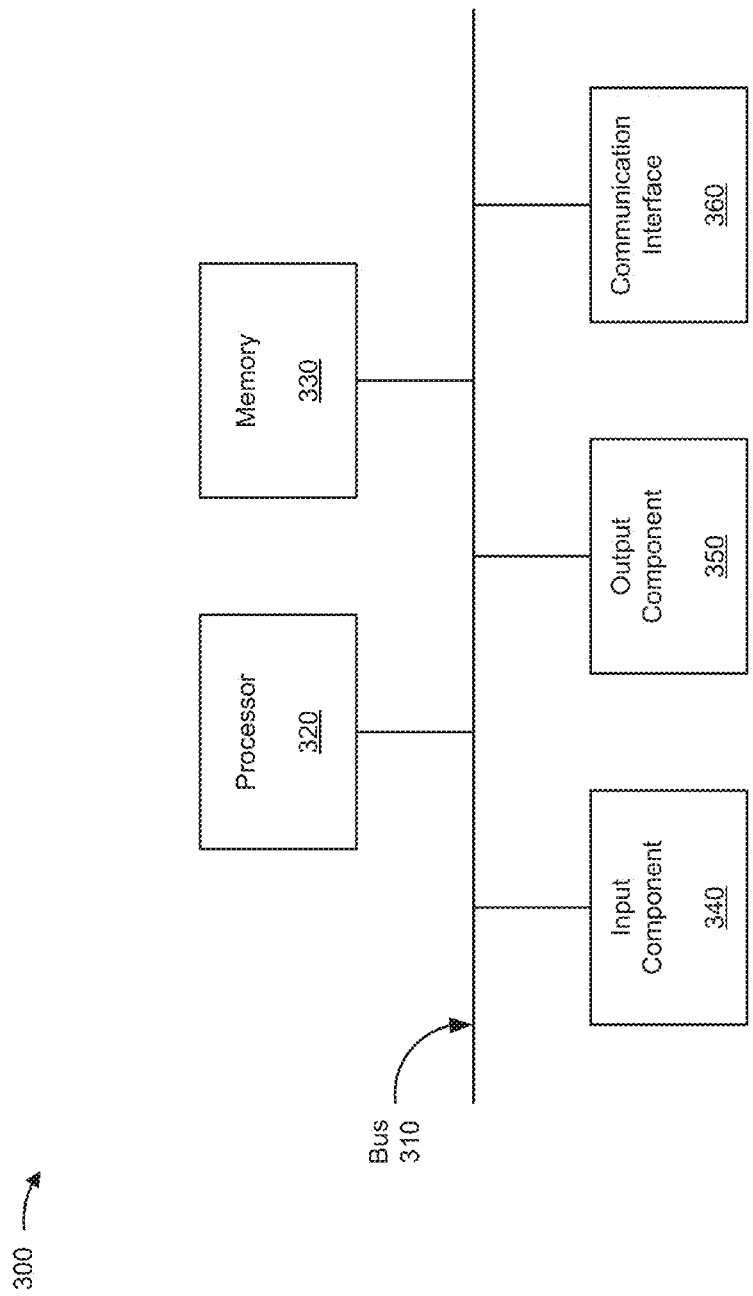
FIG. 3 is a diagram of example components of one or more devices of FIG. 2.

FIG. 3 is a diagram of example components of a device 300. Device 300 may correspond to client device 210, source device 220, source database 230, destination device 240, and/or destination database 250. In some implementations, each of client device 210, source device 220, source database 230, destination device 240, and/or destination database 250 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, one or more of the components of device 300 may perform one or more functions described as being performed by another one or more components of device 300.

Figure 4:
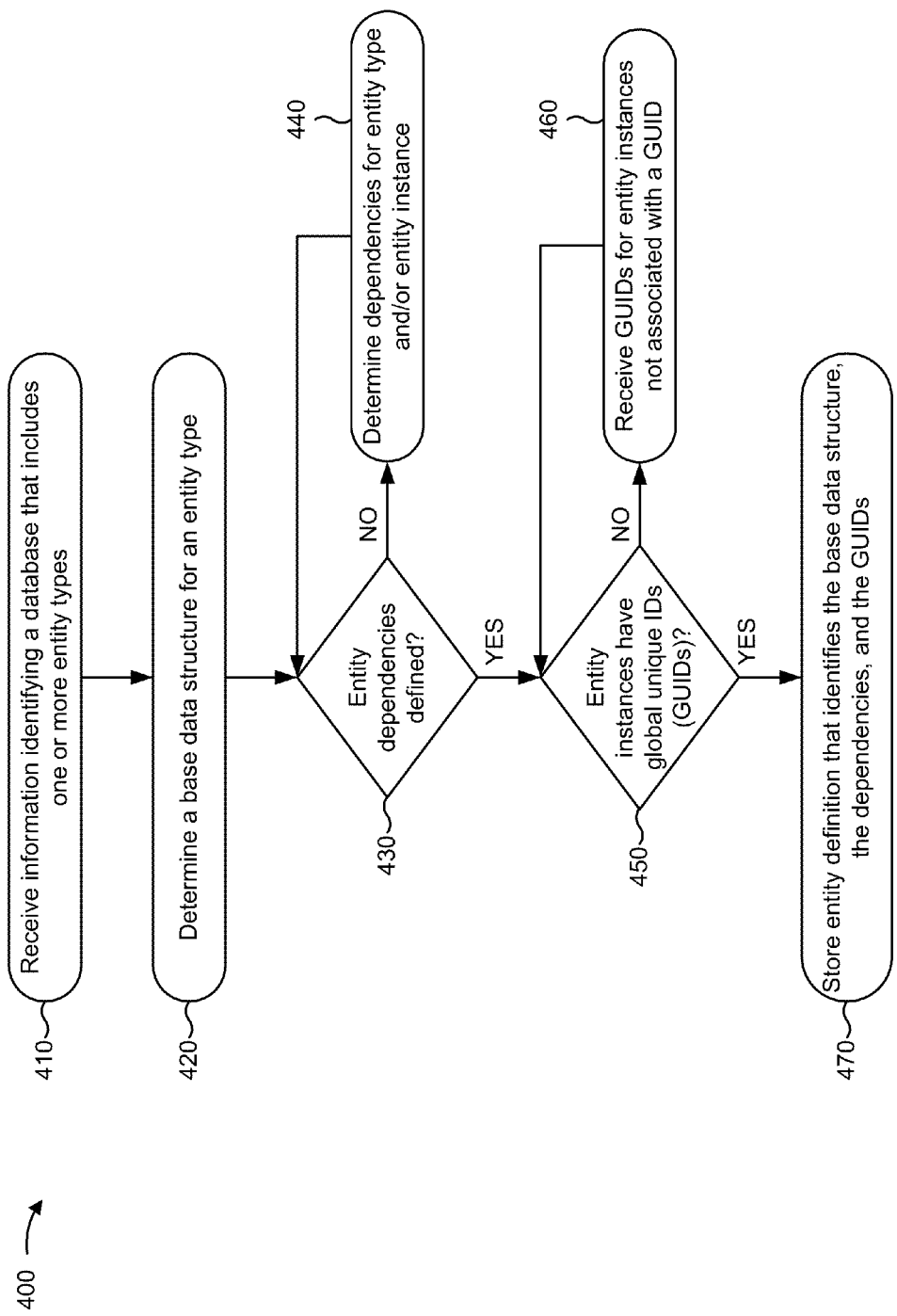
FIG. 4 is a flow chart of an example process for creating an entity definition for a database entity.

FIG. 4 is a flow chart of an example process 400 for creating an entity definition for a database entity. In some implementations, one or more process blocks of FIG. 4 may be performed by client device 210. Additionally, or alternatively, one or more process blocks of FIG. 4 may be performed by another device or a group of devices separate from or including client device 210, such as source device 220, source database 230, destination device 240, and/or destination database 250.

As shown in FIG. 4, process 400 may include receiving information identifying a database that includes one or more entity types (block 410). For example, client device 210 may receive (e.g., based on user input) information that identifies a database, such as source database 230. For example, a user may input information that identifies the database, such as a name of the database, a memory location at which the database is stored, etc. Client device 210 may obtain information associated with the database based on the input information (e.g., may obtain information stored in the database).

The database may include information associated with one or more entity types. An entity type may describe a class of attributes that define entity instances of the entity type. For example, an entity type of "USER" may include attributes of "first name," "last name," "username," "password," etc. An entity type may include, for example, configuration information that controls a manner in which the database functions, such as information that identifies a user, a group, a formula, a rule, an action, a workflow item, an access permission, etc.

In some implementations, an attribute of an entity instance may include a global unique identifier (GUID) that uniquely identifies the entity instance among all entity instances stored in the database. Client device 210 may require that a GUID be associated with an entity instance before the entity instance may be modified and/or analyzed (e.g., migrated, deleted, compared, etc.) using the destination database. Additionally, or alternatively, an attribute of an entity instance may include a reference to another entity instance from which the entity instance depends. The reference may include a foreign key that points to and/or identifies the other entity instance. For example, the foreign key may include a GUID that identifies the other entity instance. Additionally, or alternatively, an attribute of an entity instance may include a reference to another entity instance that depends on the entity instance (e.g., identified using a GUID).

As further shown in FIG. 4, process 400 may include determining a base data structure for an entity type (block 420). For example, client device 210 may receive (e.g., based on user input) information that identifies a base data structure (e.g., a base table, a base node, a base branch, etc.) for an entity type. The base data structure may serve as a basis for client device 210 to determine dependencies associated with an entity type and/or to determine information, stored in a database, to be operated on. For example, when determining dependencies for an entity type and/or an entity instance, client device 210 may determine child data structure(s) that depend on the base data structure, and/or may determine parent data structure(s) from which the base data structure depends.

The base data structure may represent a root level of a hierarchy of data structures associated with an entity type and/or an entity instance. The hierarchy of data structures may include a parent level identifying one or more parent data structures upon which the base data structure depends. The hierarchy may further include a grandparent level identifying one or more grandparent data structures upon which the base data structure depends (e.g., identifying parents of the parents of the base data structure), a great-grandparent level identifying one or more great-grandparent data structures upon which the base data structure depends (e.g., identifying parents of the grandparents of the base data structure), etc.

Similarly, the hierarchy of data structures may include a child level identifying one or more child data structures that depend upon the base data structure. The hierarchy may further include a grandchild level identifying one or more grandchild data structures upon which the base data structure depends (e.g., identifying children of the children of the base data structure), a great-grandchild level identifying one or more great-grandchild data structures upon which the base data structure depends (e.g., identifying children of the grandchildren of the base data structure), etc.

As further shown in FIG. 4, process 400 may include determining whether dependencies are defined for an entity type and/or an entity instance (block 430). For example, client device 210 may determine whether dependencies have been defined for one or more particular entity types (e.g., entity types selected by a user for modification and/or analysis) or for all entity types in the database. Client device 210 may make this determination by determining whether an entity type and/or an entity instance of the entity type is associated with a foreign key (e.g., whether a row or column of a database table for an entity instance includes a foreign key).

If client device 210 determines that dependencies are not defined for an entity type and/or an entity instance (block 430—NO), then process 400 may include determining dependencies for the entity type and/or the entity instance (block 440). For example, if an entity type and/or instance is not associated with a foreign key, then client device 210 may determine an implied foreign key for the entity type and/or instance. Additionally, or alternatively, client device 210 may prompt a user to input a foreign key for the entity type and/or instance. Client device 210 may receive information identifying the foreign key, or may receive an indication that a particular entity type and/or instance is not associated with a foreign key (e.g., does not depend on another entity type and/or instance).

In some implementations, client device 210 may search the database to ensure that dependencies are defined for the entire database (e.g., all entity types and/or instances), or to ensure that dependencies are defined for a selected portion of the database (e.g., a user selection that identifies entity types and/or instances to be operated on). If there are undefined dependencies, client device 210 may prompt a user to define the undefined dependencies.

If client device 210 determines that dependencies are defined for an entity type and/or entity instance (block 430—YES), then process 400 may include determining whether entity instances are associated with a global unique identifier (block 450). For example, client device 210 may determine whether GUIDs have been defined for one or more particular entity instances (e.g., entity instances selected by a user for modification and/or analysis) or for all entity instances in the database. Client device 210 may make this determination by determining whether an entity instance is associated with a GUID (e.g., whether a row or column of a database table for an entity instance includes a GUID). Client device 210 may query the database to determine whether a GUID is unique for an entity instance. The GUID may include a unique identifier that is not used more than once, and client device 210 may ensure that the same identifier is not used more than once.

If client device 210 determines that GUIDs are not defined for an entity instance (block 450—NO), then process 400 may include receiving GUIDs for entity instances not associated with a GUID (block 460). For example, if an entity instance is not associated with a GUID, then client device 210 may create a GUID for the entity instance (e.g., may create an identifier that is different than all other identifiers used to identify other entity instances). Additionally, or alternatively, client device 210 may prompt a user to input a GUID for the entity instance.

In some implementations, client device 210 may search the database to ensure that GUIDs are defined for the entire database (e.g., all entity types and/or instances), or to ensure that GUIDs are defined for a selected portion of the database (e.g., a user selection that identifies entity types and/or instances to be operated on). If there are undefined GUIDs, client device 210 may prompt a user to define the undefined GUIDs. The user may input GUIDs for entity instances identified as needing a GUID.

If client device 210 determines that dependencies are defined for the entity types (block 430—YES) and that GUIDs are defined for the entity instances (block 450—YES), then process 400 may include storing an entity definition that identifies the base data structure, the dependencies, and the GUIDs (block 470). For example, client device 210 may store an entity definition. The entity definition may identify a base data structure for an entity type, may identify dependencies associated with an entity type (e.g., one or more parent entity types, one or more child entity types, one or more grandparent entity types, one or more grandchild entity types, etc.), may identify dependencies associated with an entity instance (e.g., one or more parent entity instances, one or more child entity instances, one or more grandparent entity instances, one or more grandchild entity instances, etc.), and/or may identify a GUID that uniquely identifies an entity instance. In this way, the entity definition may identify the hierarchy of data structures associated with a particular entity type and/or entity instance.

Client device 210 may store an entity definition for one or more particular entity types (e.g., user-selected entity types), for one or more particular entity instances (e.g., user-selected entity instances), for all entity types in the database, for all entity instances in the database, etc. In some implementations, client device 210 may prompt a user for input to define entity types, dependencies, and/or GUIDs until a complete entity definition has been defined for all entity types and/or instances in the database.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
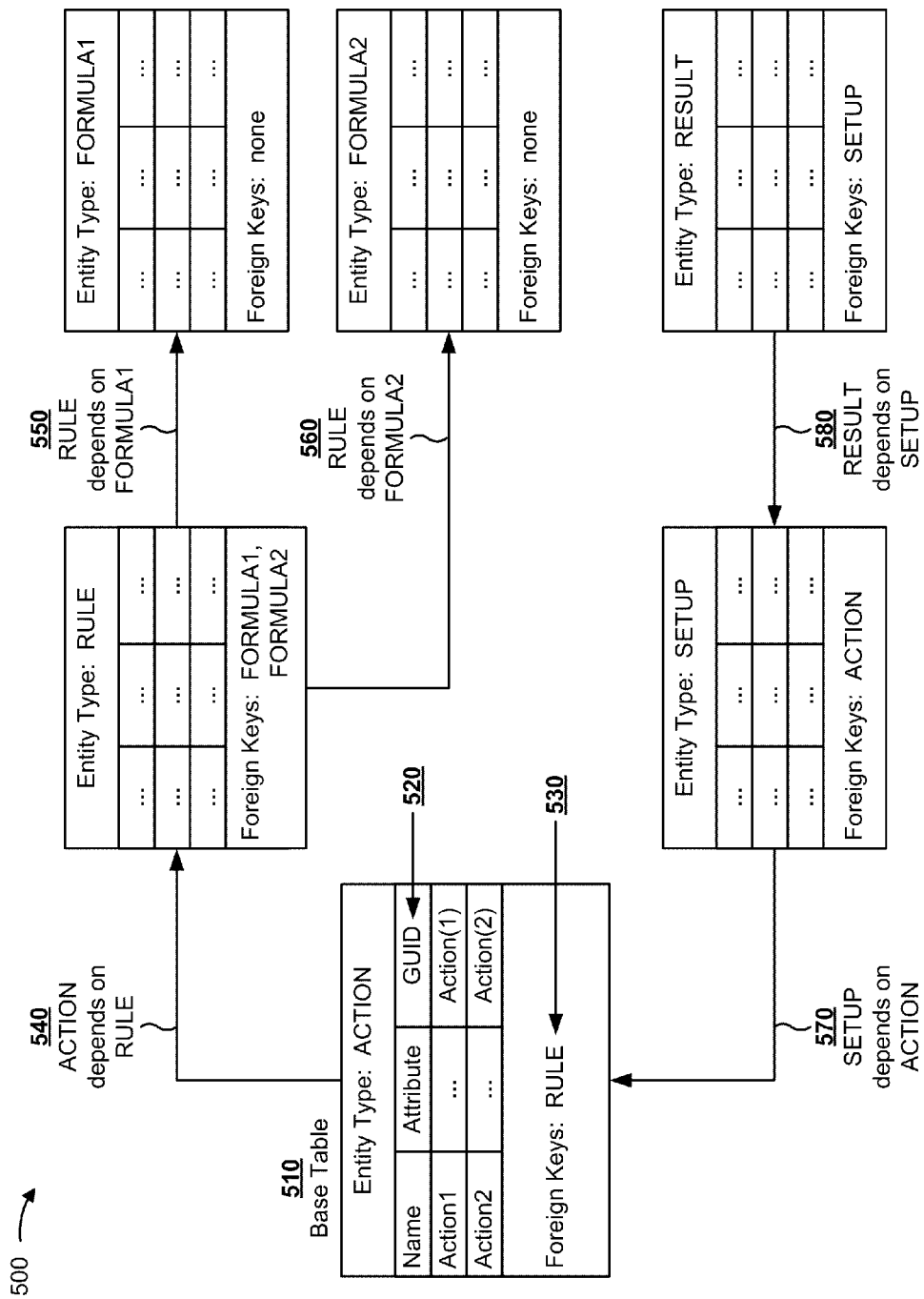
FIG. 5 is a diagram of an example implementation relating to the example process shown in FIG. 4.

FIG. 5 is a diagram of an example implementation 500 relating to example process 400 shown in FIG. 4. FIG. 5 depicts a representation of an example entity definition that may be created using process 400 of FIG. 4.

As shown in FIG. 5, and by reference number 510, assume that a user has provided input to client device 210 to identify a base table for an entity type identified as "ACTION." The base table for the ACTION entity type includes two example entity instances of an ACTION entity type, shown as Action1 and Action2. As shown, the entity instances are associated with various attributes. For example, as shown by reference number 520, the entity instances are associated with a GUID of Action(1) for the Action1 instance, and a GUID of Action(2) for the Action2 instance. As shown by reference number 530, the base table for the ACTION entity type further identifies a foreign key that points to a RULE entity type from which the ACTION entity type depends.

As shown by reference number 540, the ACTION entity type depends on the RULE entity type, which is associated with a RULE table. As shown by reference numbers 550 and 560, the RULE entity type depends on a FORMULA1 entity type and a FORMULA2 entity type. Thus, as shown, a particular entity type may depend on multiple other entity types.

As shown by reference number 570, a SETUP entity type identifies (e.g. using a foreign key) the ACTION entity type as a parent table of the SETUP table. Thus, the SETUP entity type depends on the ACTION entity type. Similarly, as shown by reference number 580, a RESULT entity type identifies (e.g., using a foreign key) the SETUP entity type as a parent table of the RESULT table. Thus, the RESULT entity type depends on the SETUP entity type. For the purpose of FIG. 5, assume that client device 210 has prompted the user when necessary to identify the above dependencies and to obtain GUIDs for entity instances that do not already have GUIDs.

As indicated above, FIG. 5 is provided merely as an example. Other examples are possible and may differ from what was described with regard to FIG. 5.

FIG. 6 is a flow chart of an example process 600 for selectively migrating data between databases based on dependencies of database entities. In some implementations, one or more process blocks of FIG. 6 may be performed by client device 210. Additionally, or alternatively, one or more process blocks of FIG. 6 may be performed by another device or a group of devices separate from or including client device 210, such as source device 220, source database 230, destination device 240, and/or destination database 250.

As shown in FIG. 6, process 600 may include receiving information that identifies a source database and a destination database to be modified or analyzed based on the source database (block 610). For example, client device 210 may receive (e.g., based on user input) information that identifies source database 230. Client device 210 may also receive (e.g., based on user input) information that identifies destination database 250 that is to modified or analyzed based on source database 230. For example, a user may input information that identifies source database 230 and/or destination database 250, such as a name of source database 230 and/or destination database 250, a memory location at which source database 230 and/or destination database 250 is stored, etc.

In some implementations, source database 230 and destination database 250 may share a common database schema. For example, source database 230 and destination database 250 may be required to share a common database scheme so that code generated based on source database 230 will correctly execute on destination database 250. Additionally, or alternatively, source database 230 and destination database 250 may operate independently. Additionally, or alternatively, source database 230 and destination database 250 may store some common information, and/or may store some different information.

As further shown in FIG. 6, process 600 may include receiving information that identifies an entity instance included in the source database (block 620). For example, client device 210 may receive user input that identifies an entity instance included in source database 230. In some implementations, client device 210 may provide entity information, such as information that identifies one or more entity types, entity instances, attributes, etc., included in source database 230. Client device 210 may provide the entity information for source database 230 based on receiving the information that identifies source database 230 and/or based on obtaining source database 230. Client device 210 may provide the entity information for display (e.g., via a user interface), and a user may interact with client device 210 to navigate the entity information and select a set of entity instances. The selected set of entity instances may include a portion of the entire set of entity instances included in source database 230.

As further shown in FIG. 6, process 600 may include determining a base data structure, included in the source database, associated with the entity instance (block 630). For example, client device 210 may determine a base data structure associated with the entity instance. Client device 210 may determine the base data structure using the entity definition, which may be created as described herein in connection with FIG. 4. For example, client device 210 may identify an entity definition associated with a selected entity instance and/or associated with an entity type of the selected entity instance. Client device 210 may determine a base data structure for the selected entity instance based on the identified entity definition, which may be stored in memory.

In some implementations (e.g., when a user selects to operate on all entity instances included in an entity type), the base data structure identified by client device 210 may include an entire base data structure associated with a particular entity type (e.g., may include all rows associated with entity instances in a base table for an entity type). Alternatively (e.g., when a user selects to operate on a portion of entity instances included in an entity type), the base data structure identified by client device 210 may include a portion (e.g., a subset) of the entire base data structure associated with a particular entity type (e.g., may include a subset of all rows, associated with selected entity instances, in a base table for an entity type).

As further shown in FIG. 6, process 600 may include generating a dependency graph that identifies dependencies associated with the base data structure and other data structures (block 640). For example, client device 210 may generate a dependency graph associated with the base data structure. The dependency graph may include, for example, a node that represents the base data structure, and one or more nodes that represent different data structures that have a dependency relationship with the base data structure (e.g., a parent relationship, a child relationship, etc.). Additionally, or alternatively the dependency graph may include links between nodes (e.g., data structures) that have a dependency relationship. A link between two nodes may include a directed link that indicates a direction of a dependency. For example, a link may indicate that a first node (e.g., a child node) depends on a second node (e.g., a parent node).

Client device 210 may generate the dependency graph by determining parent data structures of the base data structure, in some implementations. For example, client device 210 may analyze the base data structure to identify one or more foreign keys that point to one or more parent data structures. Additionally, or alternatively, client device 210 may determine that a particular data structure is a parent data structure of a base data structure when the particular data structure identifies a parent association with the base data structure (e.g., using a GUID of the base data structure). Client device 210 may add the parent data structure(s) to the dependency graph, and may add link(s) between the parent data structure(s) and the base data structure to indicate that the parent data structure(s) are parents of the base data structure (e.g., that the base data structure depends on the parent data structure(s)).

Client device 210 may further analyze the identified parent data structures to determine foreign key(s) that point to one or more parents of the parent data structures (e.g., grandparents of the base data structure). Client device 210 may continue to analyze the database in this manner, identifying data structures to add to the dependency graph using foreign keys, until client device 210 identifies a data structure, in each branch of the dependency graph, that does not include a foreign key (e.g., that does not have a parent data structure).

Additionally, or alternatively, client device 210 may generate the dependency graph by determining child data structures of the base data structure. For example, client device 210 may search source database 230 to identify one or more child data structures that include a foreign key that points to the base data structure. Additionally, or alternatively, client device 210 may determine that a particular data structure is a child data structure of a base data structure when the base data structure identifies a child association with the particular data structure (e.g., using a GUID of the child data structure). Client device 210 may add the child data structure(s) to the dependency graph, and may add link(s) between the child data structure(s) and the base data structure to indicate that the child data structure(s) are children of the base data structure (e.g., that the child data structure(s) depend on the base data structure).

Client device 210 may further search source database 230 to identify one or more grandchild data structures that include a foreign key that points to a child data structure. Client device 210 may continue to analyze the database in this manner, identifying data structures to add to the dependency graph using foreign keys, until client device 210 determines that all data structures that include a foreign key that points to the base data structure or a descendent of the base data structure (e.g., a child, a grandchild, etc.) have been added to the dependency graph.

In this way, client device 210 may generate a dependency graph that identifies a hierarchy of data structures associated with a particular entity type and/or entity instance, and that identifies dependency relationships between data structures included in the hierarchy of data structures. For example, the dependency graph may include a root node and/or a base node that represents the base data structure, may include one or more parent nodes, grandparent nodes, etc. that represent parent data structures, grandparent data structures, etc. of the base data structure, and/or may include one or more child nodes, grandchild nodes, etc. that represent child data structures, grandchild data structures, etc. of the base data structure.

In some implementations, client device 210 may provide (e.g., via a user interface) an option for a user to choose to include or exclude parents and/or children of the base data structure from the dependency graph. Client device 210 may generate the dependency graph based on a selected option (e.g., including or excluding a parent and/or a child from the dependency graph, and from being operated on). In some implementations, client device 210 may generate the dependency graph using a Structured Query Language (SQL) SELECT command to load a particular entity instance into the dependency graph (e.g., into memory). Client device 210 may store the generated dependency graph in memory.

As further shown in FIG. 6, process 600 may include receiving an instruction to modify or analyze the destination database (block 650). For example, client device 210 may receive an instruction, input by a user, to modify or analyze destination database 250. Additionally, or alternatively, client device 210 may automatically modify or analyze destination database 250 at a particular date and/or time (e.g., based on user input identifying the particular date and/or time).

In some implementations, the instruction to modify destination database 250 may include an instruction to perform a migration operation to migrate information from source database 230 to destination database 250. The migration operation may include, for example, an insert operation to insert new information from source database 230 to destination database 250, an update operation to update existing information stored in destination database 250 with information stored in source database 230, an upsert operation to update information already stored in destination database 250 and to insert information not already stored in destination database 250, or the like.

Additionally, or alternatively, the instruction to modify destination database 250 may include an instruction to perform a deletion operation to delete information from destination database 250 based on information stored in source database 230. In some implementations, an instruction to analyze destination database 250 may include an instruction to perform a comparison operation to compare information stored in source database 230 and information stored in destination database 250.

As further shown in FIG. 6, process 600 may include traversing the dependency graph, based on an evaluation order, to generate code to perform the instruction (block 660). For example, client device 210 may determine an evaluation order for the data structures (e.g., nodes) in the dependency graph, and may traverse the dependency graph, based on the evaluation order, to generate code to perform the instruction. The code may include, for example, Structured Query Language (SQL) code, Extensible Markup Language (XML) code, JavaScript Object Notation (JSON) code, and/or other code that may be used to cause an operation to be performed to modify or analyze destination database 250.

As an example, the evaluation order may include first evaluating parent nodes (e.g., starting with a top-level parent node and working down to the root node), then evaluating the root node, then evaluating child nodes (e.g., ending with a bottom-level child node). As another example, the evaluation order may include first evaluating child nodes (e.g., starting with a bottom-level child node and working up to the root node), then evaluating the root node, then evaluating parent nodes (e.g., ending with a top-level parent node). In some implementations, the evaluation order may include an order that ensures that a particular node is not evaluated until all parent nodes of the particular node are evaluated. Alternatively, the evaluation order may include an order that ensures that a particular node is not evaluated until all child nodes of the particular node are evaluated.

Client device 210 may determine the evaluation order based on the type of operation, in some implementations. For example, for a migration operation, client device 210 may ensure that a particular node is not evaluated until all parent nodes of the particular node are evaluated (e.g., nodes are evaluated top-down in the hierarchy from parent to child). As another example, for a deletion operation, client device 210 may ensure that a particular node is not evaluated until all child nodes of the particular node are evaluated (e.g., nodes are evaluated bottom-up in the hierarchy from child to parent). For a comparison operation, client device 210 may evaluate nodes bottom-up or top-down in the hierarchy. Additionally, or alternatively, client device 210 may evaluate nodes in any order to generate code, but may ensure that the generated code is executed based on the evaluation order.

Client device 210 may traverse the dependency graph in the evaluation order to generate code for performing an identified operation. For example, client device 210 may traverse the dependency graph by visiting and/or accessing a first node, that represents a first data structure, and generating a first code portion for performing the operation using the first data structure (e.g., migrating, deleting, comparing, etc. the first data structure). Client device 210 may continue traversing the dependency graph by visiting and/or accessing a second node, that represents a second data structure, and generating a second code portion for performing the operation using the second data structure. In some implementations, client device 210 may traverse the dependency graph based on a link (e.g., a link that identifies a dependency relationship between the first data structure and the second data structure). Client device 210 may continue traversing the dependency graph in this manner until code portions have been generated for all data structures identified in the dependency graph.

As further shown in FIG. 6, process 600 may include causing the code to be executed, to modify or analyze the destination database, based on the evaluation order (block 670). For example, client device 210 may cause execution of the code by executing the code (e.g., locally), which may cause an operation, identified by the instruction, to be performed. Additionally, or alternatively, client device 210 may cause execution of the code by providing the code to another device, which may cause the other device to execute the code. For example, client device 210 may provide the code to source device 220 and/or destination device 240.

Source device 220 and/or destination device 240 may execute the code to cause the operation to be performed.

In some implementations, client device 210 may cause multiple different portions of code to be executed in the evaluation order. The evaluation order in which the portions of code are executed may be based on the operation to be performed. For example, when performing a migration operation, client device 210 may execute the code top-down in the hierarchy (e.g., migrating parent data structures before migrating child data structures). In this way, client device 210 may ensure that a parent data structure is migrated to destination database 250 before a child data structure, that depends on the parent data structure, is migrated. This may ensure continuity of data in destination database 250, and may prevent errors from occurring. When performing a migration operation, execution of a particular portion of code may cause information stored in a data structure, corresponding to the particular portion of code, to be migrated from source database 230 to destination database 250.

When migrating a source entity instance from source database 230 to destination database 250, client device 210 may use the GUID of the source entity instance in source database 230 to identify a destination entity instance, in destination database 250, that corresponds to the source entity instance. Client device 210 may determine whether the source entity instance includes the same information as the destination entity instance. If the information is the same, then client device 210 may not migrate the information to destination database 250. If the information is different, then client device 210 may update the information in destination database 250 (e.g., the information associated with the destination entity instance). If the GUID is not present in destination database 250 (e.g., the destination entity instance does not exist), then client device 210 may insert the information into destination database 250.

As another example, when performing a deletion operation, client device 210 may execute the code bottom-up in the hierarchy (e.g., deleting child data structures before deleting parent data structures). In this way, client device 210 may ensure that a child data structure is deleted from destination database 250 before a parent data structure, from which the child depends, is migrated. This may ensure continuity of data in destination database 250, and may prevent errors from occurring. When performing a deletion operation, execution of a particular portion of code may cause information stored in a data structure, corresponding to the particular portion of code, to be deleted from destination database 250.

When deleting an entity instance from destination database 250, client device 210 may receive information that identifies a GUID of a source entity instance in source database 230, and may use the GUID to identify a destination entity instance, in destination database 250, that corresponds to the source entity instance. Client device 210 may delete the destination entity instance from destination database 250.

As another example, when performing a comparison operation, client device 210 may execute the code in any manner (e.g., top-down, bottom-up, etc.), and/or may execute the code in a manner specified by a user. When performing a comparison operation, execution of a particular portion of code may cause information stored in a data structure, corresponding to the particular portion of code, to be exported for comparison. For example, the information may be exported in an XML format, a JSON format, a comma-separated value (CSV) format, a text format, or a combination of these or other types of formats. The information may be exported to a differencing tool to compare a source data structure, stored by source database 230, and a corresponding destination data structure, stored by destination database 250.

When comparing a source entity instance stored in source database 230 and a destination entity instance stored in destination database 250, client device 210 may generate a dependency graph for both the source entity instance (e.g., using source database 230) and the destination entity instance (e.g., using destination database 250). Client device 210 may traverse a source dependency graph to export information identified in the hierarchy of data structures included in the source dependency graph, and may traverse a destination dependency graph to export information identified in the hierarchy of data structures included in the destination dependency graph. Client device 210 may export the information to a differencing tool, which may provide an indication of information that differs between the source entity instance and the destination entity instance.

In some implementations, client device 210 may generate code portions for all of the nodes in a dependency graph before causing any of the code portions to be executed. Alternatively, client device 210 may generate a first code portion (e.g., corresponding to a first node), and may cause the first code portion to be executed. Client device 210 may then generate a second code portion (e.g., after causing the first code portion to be executed), and may cause the second code portion to be executed. In some cases, this may increase the speed at which an operation is performed. For example, client device 210 may provide the code portions to a target device for execution. In this case, the target device may execute a code portion while client device 210 generates the next code portion, thus increasing the overall speed of the operation.

In some implementations, client device 210 may determine a result of the execution, and may provide the result for display. For example, client device 210 may determine the result of the execution, and/or may receive information that identifies the result from source device 220 and/or destination device 240. In some implementations, the result may indicate that a modification of destination database 250 was successful, and/or may provide information that identifies modifications made to destination database 250 (e.g., migrated entity instances, deleted entity instances, etc.). Additionally, or alternatively, the result may include a result of a comparison analysis, such as information that identifies one or more differences between selected entity instances of source database 230 and corresponding entity instances of destination database 250.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of selectively migrating data from a source database to a destination database.

Figure 7A:
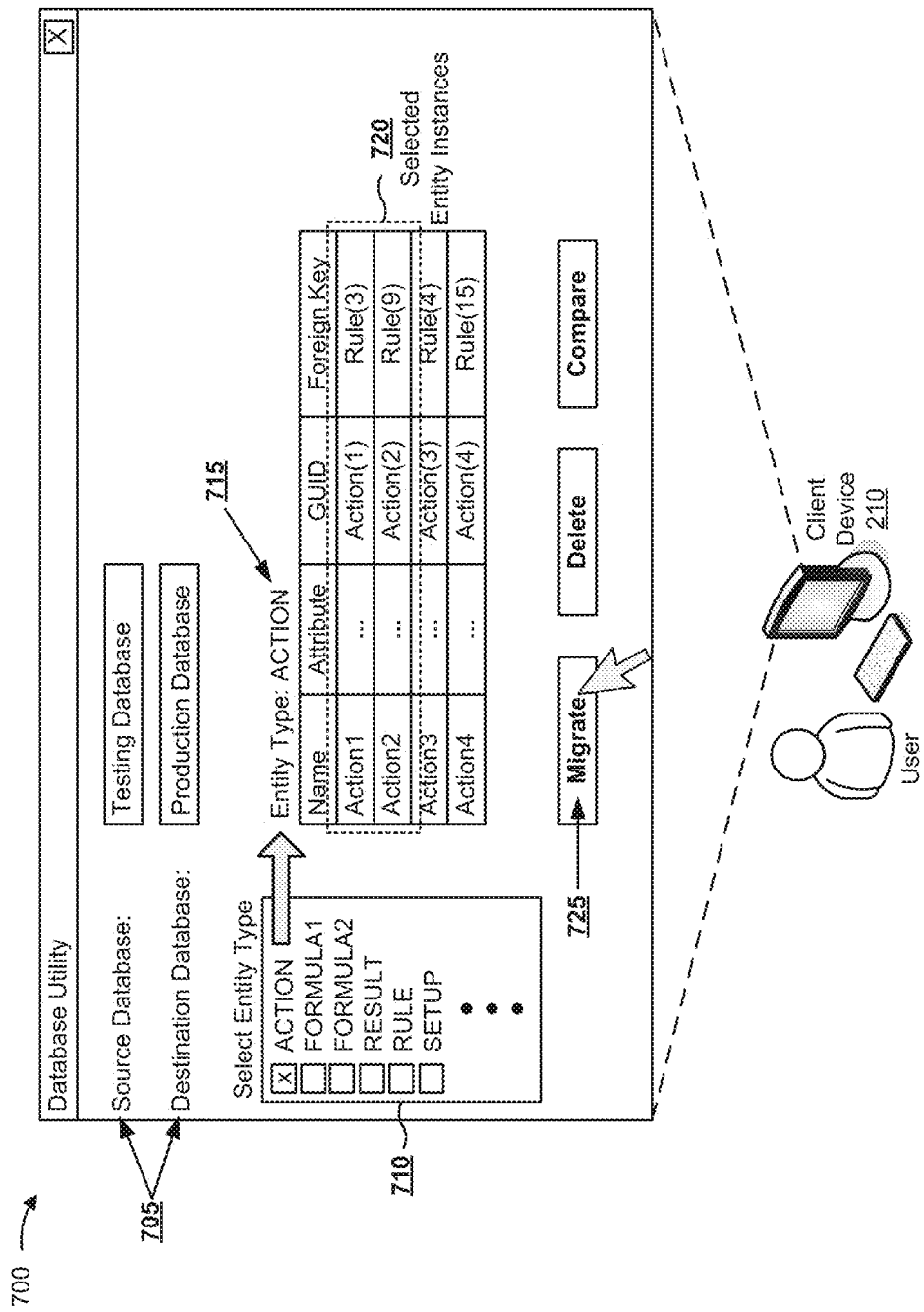
FIGS. 7A-7D are diagrams of an example implementation relating to the example process shown in FIG. 6.

As shown in FIG. 7A, a user may interact with client device 210 to input information relating to migrating information from a source database to a destination database. As shown by reference number 705, the user may input information that identifies the source database, shown as "Testing Database," and the destination database, shown as "Production Database." Based on the user identification of the source database, client device 210 may provide a list of entity types included in the source database, as shown by reference number 710.

As shown by reference number 715, assume that the user selects the ACTION entity type, and that client device 210 provides a list of entity instances of the ACTION entity type. For example, assume that the entity instances include Action1 with a GUID of Action(1) and a foreign key reference to an entity instance identified by a GUID of Rule(3), Action2 with a GUID of Action(2) and a foreign key reference to an entity instance identified by a GUID of Rule(9), Action3 with a GUID of Action(3) and a foreign key reference to an entity instance identified by a GUID of Rule(4), and Action4 with a GUID of Action(4) and a foreign key reference to an entity instance identified by a GUID of Rule(15).

As shown by reference number 720, assume that the user selects entity instances Action1 and Action2, and further selects to migrate Action1 and Action2 from the Testing Database to the Production Database, as shown by reference number 725.

Figure 7B:
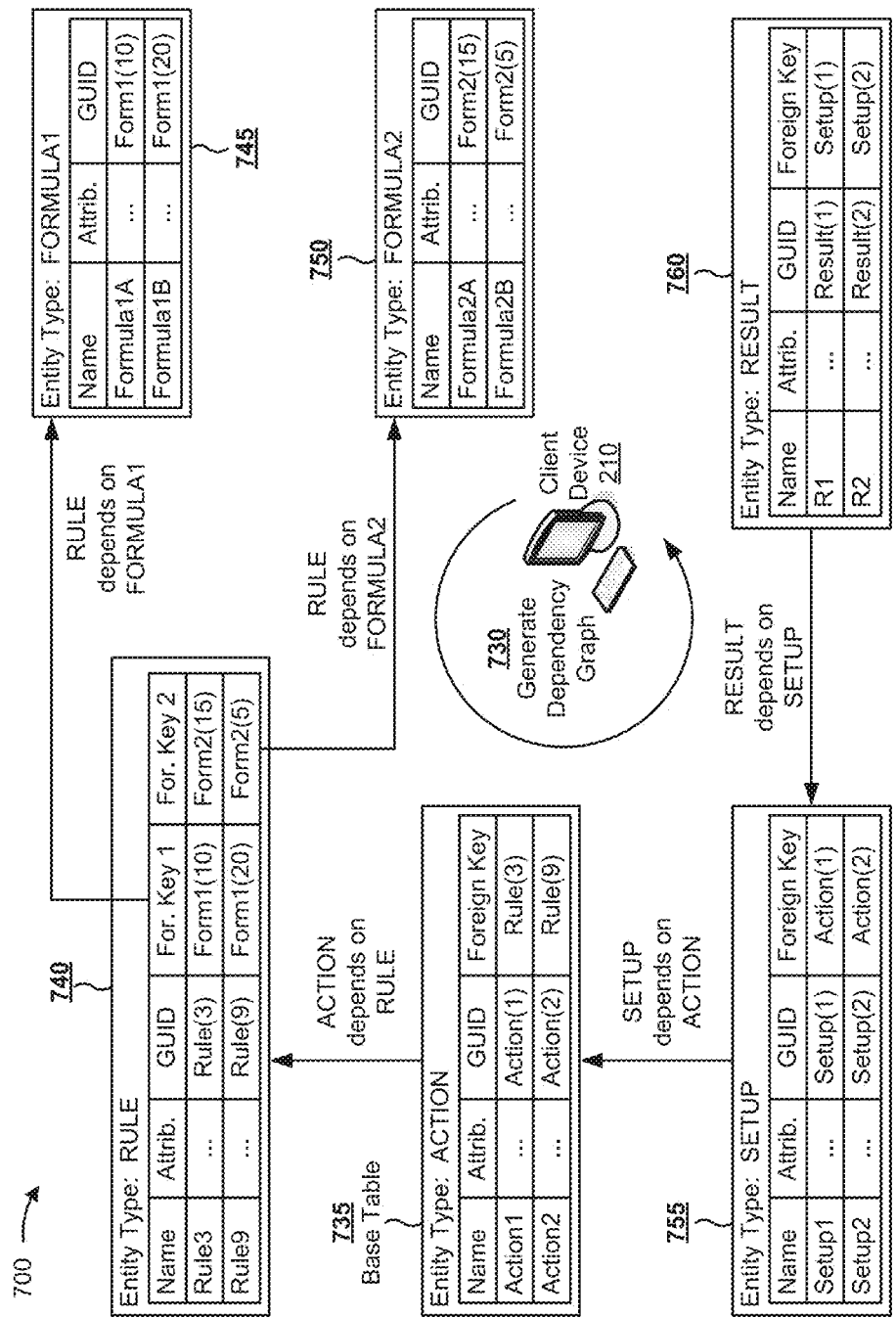

As shown in FIG. 7B, and by reference number 730, client device 210 generates a dependency graph for the selected entity instances named Action1 and Action2. For example, assume that client device 210 identifies a base table for Action1 and Action2, shown as ACTION table 735, and adds ACTION table 735 to the dependency graph. ACTION table 735 is a subset of the entire table for the ACTION entity type, shown in FIG. 7A (e.g., a subset that includes selected entity instances Action1 and Action2). Client device 210 analyzes ACTION table 735 to identify two foreign keys, Rule(3) and Rule(9), that point to two respective entity instances, named Rule3 and Rule9, included in RULE table 740. Thus, client device 210 adds RULE table 740 to the dependency graph, and adds a link that indicates that ACTION table 735 depends on RULE table 740 (e.g., RULE table 740 is a parent table of ACTION table 735).

Next, assume that client device 210 analyzes RULE table 740 to identify two sets of foreign keys. The first set of foreign keys, shown as Form1(10) and Form1(20), point to two respective entity instances, named Formula1A and Formula1B, included in FORMULA1 table 745. The second set of foreign keys, shown as Form2(15) and Form2(5), point to two respective entity instances, named Formula2A and Formula2B, included in FORMULA2 table 750. Thus, client device 210 adds FORMULA1 table 745 and FORMULA2 table 750 to the dependency graph, and adds a link that indicates that FORMULA1 table 745 and FORMULA2 table 750 are parent tables of RULE table 740. Assume that FORMULA1 table 745 and FORMULA2 table 750 do not include any foreign keys, and are thus top-level parent data structures.

After determining all hierarchical ancestor data structures (e.g., parents, grandparents, great-grandparents, etc.) of ACTION table 735, client device 210 searches the source database to identify all hierarchical descendent data structures (e.g., children, grandchildren, great-grandchildren, etc.) that depend from ACTION table 735. In some implementations, client device 210 may determine descendents before determining ancestors, and/or may determine ancestors and descendents in parallel.

As further shown in FIG. 7B, assume that client device 210 searches the Testing Database to identify foreign keys that point to entity instances Action1 and/or Action2, and determines that SETUP table 755 includes two entity instances, named Setup1 and Setup2, that point to Action1 and Action2, respectively. Thus, client device 210 adds SETUP table 755 to the dependency graph, and adds a link that indicates that SETUP table 755 is a child table of ACTION table 735 (e.g., and/or that ACTION table 735 is a parent table of SETUP table 755).

As further shown in FIG. 7B, assume that client device 210 searches the database to identify foreign keys that point to entity instances Setup1 and/or Setup2, and determines that RESULT table 760 includes two entity instances, named R1 and R2, that point to Setup1 and Setup2, respectively. Thus, client device 210 adds RESULT table 760 to the dependency graph, and adds a link to indicate that RESULT table 760 is a child table of SETUP table 755. Assume that no data structures point to RESULT table 760, which is thus a bottom-level child data structure. Furthermore, assume that FIG. 7B depicts the complete dependency graph for the selected entity instances Action1 and Action2.

Figure 7C:
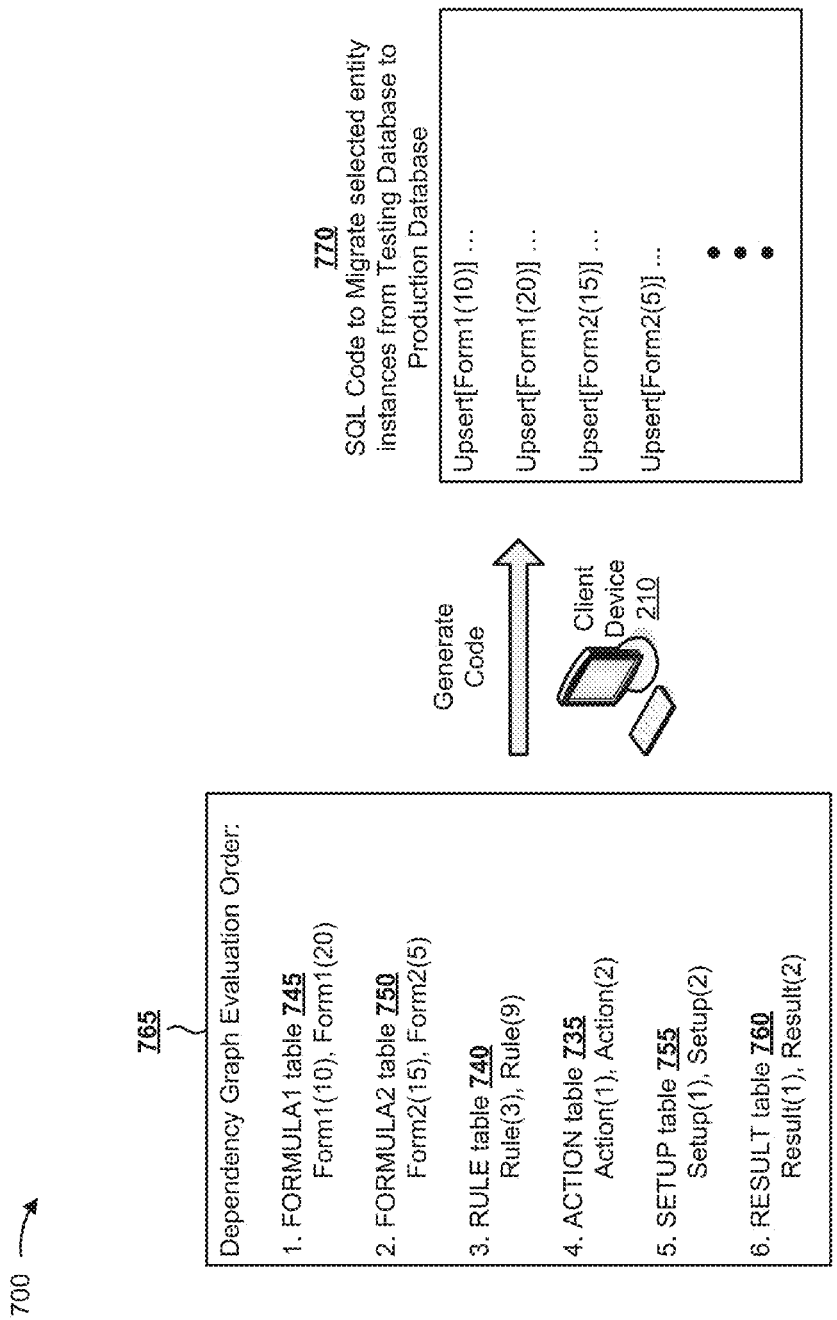

As shown in FIG. 7C, and by reference number 765, assume that client device 210 determines an evaluation order for the data structures included in the dependency graph depicted in FIG. 7B. For example, the entity instances in top-level parent data structures FORMULA1 table 745 and FORMULA2 table 750 will be evaluated to generate code first, before other data structures. Because these two tables do not depend on one another (e.g., are independent top-level parent data structures), client device 210 may evaluate these two tables in any order. However, because RULE table 740 depends on FORMULA1 table 745 and FORMULA2 table 750, both of these tables must be evaluated before RULE table 740.

As further shown by reference number 765 (e.g., the dependency graph evaluation order), the entity instances in RULE table 740 will be evaluated third, the entity instances in ACTION table 735 will be evaluated fourth, the entity instances in SETUP table 755 will be evaluated fifth, and the entity instances in RESULT table 760 will be evaluated last. As shown by reference number 770, client device 210 generates SQL code, to migrate the selected entity instances from the Testing Database to the Production Database, based on the determined evaluation order. For example, client device 210 generates code to migrate the entity instances in FORMULA1 table 745, identified by GUIDs Form1(10) and Form1(20), first. As further shown, client device 210 generates code to migrate the entity instances in FORMULA2 table 750, identified by GUIDs Form2(15) and Form2(5), after migrating Form1(10) and Form1(20). Client device 210 may continue to generate code in this manner until all data structures in the hierarchy (e.g., identified in the dependency graph) have been used to generate code.

Figure 7D:
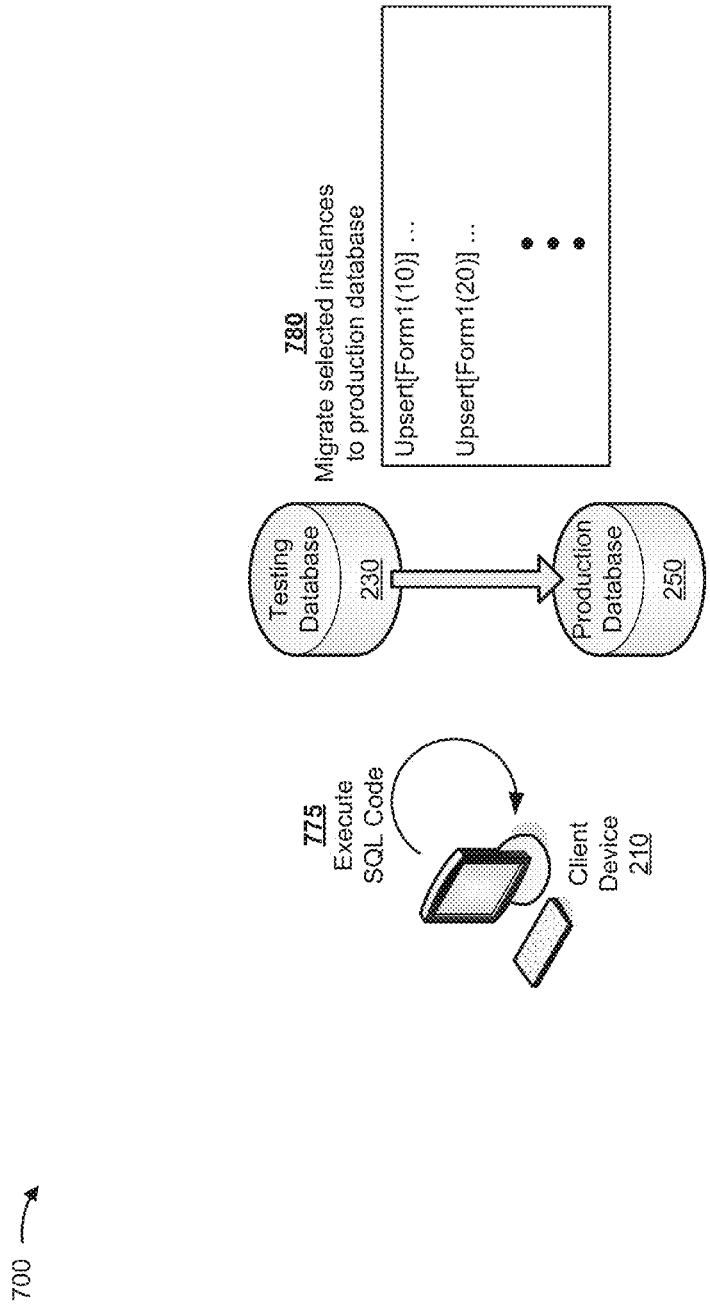

As shown in FIG. 7D, and by reference number 775, assume that client device 210 executes the code. As shown by reference number 780, execution of the code causes the entity instances, identified in the dependency graph, to be migrated in evaluation order from (e.g., upserted from) Testing Database 230 to Production Database 250. In this way, client device 210 ensures that the code will be executed in an order that guarantees that all necessary parent information has been migrated to Production Database 250 before child information, that depends on the parent information, is migrated to Production Database 250. Similarly, when deleting information from Production Database 250, client device 210 may delete information from child data structures first, to ensure that no errors are generated by deleting parent data structures from which the child data structures depend.

As indicated above, FIGS. 7A-7D are provided merely as an example. Other examples are possible and may differ from what was described with regard to FIGS. 7A-7D.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Similarly, as used herein, a "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A device, comprising:
one or more processors that execute instructions to perform operations to:
receive information that identifies a source database and a destination database;
receive information that identifies an entity instance included in the source database;
determine a base data structure, included in the source database, that is associated with the entity instance;
generate a dependency graph that identifies a dependency between the base data structure and another data structure;
receive an instruction to perform an operation relating to modifying or analyzing the destination database, the operation selectively including a migration operation from the source database to the destination database or a deletion operation from the destination database;
determine an evaluation order for traversing the dependency graph to generate code for performing the operation,
the evaluation order being based on the operation to be performed and the dependency between the base data structure and the other data structure, the evaluation order indicating a traversal of the dependency graph top-down in a hierarchy of child nodes and parent nodes if the operation includes the migration operation, and the evaluation order indicating a traversal of the dependency graph bottom-up in the hierarchy of child nodes and parent nodes if the operation includes the deletion operation;

traverse the dependency graph in the evaluation order;

generate a plurality of portions of code corresponding to respective data structures identified by the dependency graph based on traversing the dependency graph, the plurality of portions of code selectively including code for at least one of migrating the respective data structures from the source database to the destination database or deleting the respective data structures from the destination database; and cause execution of the plurality of portions of code based on the evaluation order, the execution causing the operation to be performed using the base data structure and the other data structure, when the operation includes the migration operation, the execution causing the migration operation to migrate a parent data structure before a child data structure based on the evaluation order, and when the operation includes the deletion operation, the execution causing the deletion operation to delete a child data structure before a parent data structure based on the evaluation order.

2. The device of claim 1, where the one or more processors, when generating the dependency graph, execute the instructions to perform operations to:

include a root node, that represents the base data structure, in the dependency graph;

include another node, that represents the other data structure, in the dependency graph;

include a link, that identifies the dependency between the base data structure and the other data structure, in the dependency graph;

where the one or more processors, when generating the plurality of portions of code, execute the instructions to perform operations to:

access the root node;

generate a first code portion, of the plurality of portions of code, based on accessing the root node,
the first code portion including code for performing the operation using the base data structure;

access the other node; and generate a second code portion, of the plurality of portions of code, based on accessing the other node,
the second code portion including code for performing the operation using the other data structure.

3. The device of claim 1, where the operation includes the migration operation, and where the one or more processors, when causing execution of the plurality of portions of code, execute the instructions to perform operations to:

cause first information identified in the base data structure to be migrated from the source database to the destination database; and cause second information identified in the other data structure to be migrated from the source database to the destination database.

4. The device of claim 1, where the operation includes the migration operation, and where the one or more processors further execute the instructions to perform operations to:

determine that the other data structure includes a parent data structure upon which the base data structure depends;

where the one or more processors, when generating the plurality of portions of code, execute the instructions to perform operations to:

generate a first portion of code, of the plurality of portions of code, corresponding to the other data structure;

generate a second portion of code, of the plurality of portions of code, corresponding to the base data structure; and where the one or more processors, when causing execution of the plurality of portions of code, execute the instructions to perform operations to:

cause the first portion of code to be executed before the second portion of code based on determining that the other data structure includes the parent data structure and based on the operation including the migration operation.

5. The device of claim 4, where the one or more processors, when determining that the other data structure includes the parent data structure, execute the instructions to perform operations to:

identify a foreign key included in the base data structure, the foreign key indicating that the base data structure depends upon the other data structure; and identify the other data structure using the foreign key.

6. The device of claim 1, where the operation includes the deletion operation, and where the one or more processors further execute the instructions to perform operations to:

determine that the other data structure includes a child data structure that depends upon the base data structure;

where the one or more processors, when generating the plurality of portions of code, execute the instructions to perform operations to:

generate a first portion of code, of the plurality of portions of code, corresponding to the base data structure;

generate a second portion of code, of the plurality of portions of code, corresponding to the other data structure; and where the one or more processors, when causing execution of the plurality of portions of code, execute the instructions to perform operations to:

cause the first portion of code to be executed before the second portion of code based on determining that the other data structure includes the child data structure and based on the operation including deletion operation.

7. The device of claim 6, where the one or more processors, when determining that the other data structure includes the child data structure, execute the instructions to perform operations to:

search the source database to identify a foreign key that points to the base data structure,
the foreign key being included in the other data structure and indicating that the other data structure depends upon the base data structure; and identify the other data structure based on searching the source database.

8. A computer-readable medium storing instructions, the instructions comprising:

one or more instructions that, when executed by one or more processors, cause the one or more processors to perform operations to:
  receive information that identifies a source database and a destination database;
  receive information that identifies an entity instance included in the source database;
  identify a first data structure, included in the source database, that stores information associated with the entity instance;
  identify a second data structure, included in the source database, that has a dependency relationship with the first data structure;
  generate a dependency graph that identifies the dependency relationship between the first data structure and the second data structure;
  traverse the dependency graph to generate code for performing an operation relating to modifying or analyzing the destination database,
    the operation selectively including a migration operation from the source database to the destination database or a deletion operation from the destination database;
  determine an evaluation order for executing the code,
    the evaluation order being based on the dependency relationship between the first data structure and the second data structure and being further based on the operation,
    the evaluation order indicating execution of the code for the first data structure and the second data structure top-down in a hierarchy of child data structures and parent data structures if the operation includes the migration operation, and
    the evaluation order indicating execution of the code for the first data structure and the second data structure bottom-up in the hierarchy of child data structures and parent data structures if the operation includes the deletion operation;
  generate a plurality of portions of code corresponding to respective data structures identified by the dependency graph based on traversing the dependency graph,
    the respective data structures including the first data structure and the second data structure,
    the plurality of portions of code selectively including code for at least one of migrating the respective data structures from the source database to the destination database or deleting the respective data structures from the destination database; and
  cause execution of the plurality of portions of code based on the evaluation order,
    the execution causing the operation to be performed using the first data structure and the second data structure,
    when the operation includes the migration operation, the execution causing the migration operation to migrate a parent data structure before a child data structure based on the evaluation order, and
    when the operation includes the deletion operation, the execution causing the deletion operation to delete a child data structure before a parent data structure based on the evaluation order.

9. The computer-readable medium of claim 8, where the one or more instructions, that cause the one or more processors to generate the dependency graph, cause the one or more processors to perform operations to:
  generate a first node that represents the first data structure;
  generate a second node that represents the second data structure;
  generate a link, between the first node and the second node, that identifies the dependency relationship between the first data structure and the second data structure;
  include the first node, the second node, and the link in the dependency graph;
  where the one or more instructions, that cause the one or more processors to generate the plurality of portions of code, cause the one or more processors to perform operations to:
    access the first node;
    generate a first portion of code, of the plurality of portions of code, based on accessing the first node, the first portion of code including code for performing the operation using the first data structure;
    access the second node; and
    generate a second portion of code, of the plurality of portions of code, based on accessing the second node,
      the second portion of code including code for performing the operation using the second data structure.

10. The computer-readable medium of claim 8, where the operation includes the migration operation, and
  where the one or more instructions, that cause the one or more processors to cause execution of the plurality of portions of code, cause the one or more processors to perform operations to:
    determine first information, identified in the first data structure, to be migrated from the source database to the destination database;
    determine second information, identified in the second data structure, to be migrated from the source database to the destination database; and
    cause the first information and the second information to be migrated from the source database to the destination database based on the evaluation order.

11. The computer-readable medium of claim 8, where the operation includes the deletion operation; and
  where the one or more instructions, that cause the one or more processors to cause execution of the plurality of portions of code, cause the one or more processors to perform operations to:
    determine first information, identified in the first data structure, to be deleted from the destination database;
    determine second information, identified in the second data structure, to be deleted from the destination database; and
    cause the first information and the second information to be deleted from the destination database based on the evaluation order.

12. The computer-readable medium of claim 8, where the operation includes a comparison operation; and
  where the one or more instructions, that cause the one or more processors to cause execution of the plurality of portions of code, cause the one or more processors to perform operations to:
    determine first information, identified in the first data structure and the second data structure, to be provided for comparison, the first information being included in the source database;
determine second information, identified in a corresponding first data structure and a corresponding second data structure, to be provided for comparison, the second information, the corresponding first data structure, and the corresponding second data structure being included in the destination database; and
cause the first information and the second information to be provided for comparison based on the evaluation order.

13. The computer-readable medium of claim 8, where the one or more instructions, that cause the one or more processors to receive the information that identifies the entity instance, cause the one or more processors to perform operations to:
provide, for display, information that identifies a plurality of entity instances included in the source database;
receive a selection of a set of entity instances,
the set of entity instances including fewer than all of the plurality of entity instances; and
receive the information that identifies the entity instance based on receiving the selection of the set of entity instances.

14. The computer-readable medium of claim 8, where the operation includes the migration operation, and
where the one or more instructions, when executed by the one or more processors, cause the one or more processors to perform operations to:
determine that the second data structure is a parent data structure upon which the first data structure depends;
identify a third data structure that is a child data structure that depends upon the first data structure;
where the one or more instructions, that cause the one or more processors to generate the plurality of portions of code, cause the one or more processors to perform operations to:
generate a first portion of code, of the plurality of portions of code, corresponding to the first data structure;
generate a second portion of code, of the plurality of portions of code, corresponding to the second data structure;
generate a third portion of code, of the plurality of portions of code, corresponding to the third data structure; and
where the one or more instructions, that cause the one or more processors to cause execution of the plurality of portions of code, cause the one or more processors to perform operations to:
cause the second portion of code to be executed before the first portion of code based on determining that the other data structure includes the parent data structure and based on the operation including the migration operation; and
cause the first portion of code to be executed before the third portion of code based on identifying the third data structure that is the child data structure and based on the operation including the migration operation.

15. A method, comprising:
identifying, by a device, a first database and a second database,
the first database storing information to be migrated to the second database;
configuring, by the device, the first database such that a respective data structure, that stores a portion of the information to be migrated, includes a respective globally unique identifier;
receiving, by the device, information that selectively identifies the respective data structure to be migrated from the first database to the second database or information to be deleted from the second database based on information included in the first database;
generating, by the device, a directed graph, in a memory of the device,
the directed graph including nodes, representing the respective data structure and a plurality of related data structures, and directed links representing dependencies between the nodes;
determining, by the device, an evaluation order in which to traverse the directed graph based on the directed links,
the evaluation order being determined based on an operation to be performed,
the evaluation order indicating traversing the directed graph top-down in a hierarchy of child nodes and parent nodes if the operation includes a migration operation, and
the evaluation order indicating traversing the directed graph bottom-up in the hierarchy of child nodes and parent nodes if the operation includes a deletion operation;
traversing, by the device, the directed graph based on the evaluation order;
generating, by the device and based on traversing the directed graph, code to perform the operation,
the code selectively including code for at least one of migrating the respective data structure from the first database to the second database or deleting information from the second database; and
causing, by the device, the code to be executed, based on the evaluation order and the operation to be performed,
when the operation includes the migration operation, the execution causing the migration operation to migrate a parent data structure before a child data structure based on the evaluation order, and
when the operation includes the deletion operation, the execution causing the deletion operation to delete a child data structure before a parent data structure based on the evaluation order.

16. The method of claim 15, where the first database and the second database share a common database schema, where the first database and the second database operate independently, and where the first database and the second database include at least some different information.

17. The method of claim 15, where generating the directed graph comprises:
generating a base node that represents the respective data structure;
generating a related node that represents a related data structure of the plurality of related data structures;
generating a link, between the base node and the related node, that identifies a dependency between the respective data structure and the related data structure;
including the base node, the related node, and the link in the directed graph; and
where generating the code further comprises:
accessing, in an order identified by the evaluation order, the base node and the related node; and
for each of the base node and the related node, generating corresponding code.

18. The method of claim 15, where generating the code comprises:
  generating a first portion of code corresponding to the respective data structure;
  generating a second portion of code corresponding to the related data structure; and
    where causing the code to be executed further comprises:
      causing the first portion of code and the second portion of code to be executed based on the evaluation order.

19. The method of claim 15, further comprising:
  determining a globally unique identifier, included in the respective data structure, that identifies the related data structure; and
  identifying the related data structure using the globally unique identifier.

20. The method of claim 15, further comprising:
  determining a globally unique identifier, included in the related data structure, that identifies the respective data structure; and
  identifying the related data structure using the globally unique identifier.

* * * * *